Oct. 28, 1958
T. R. LE BLEU
2,857,679
SURVEYOR'S COMPASS
Filed Oct. 25, 1956
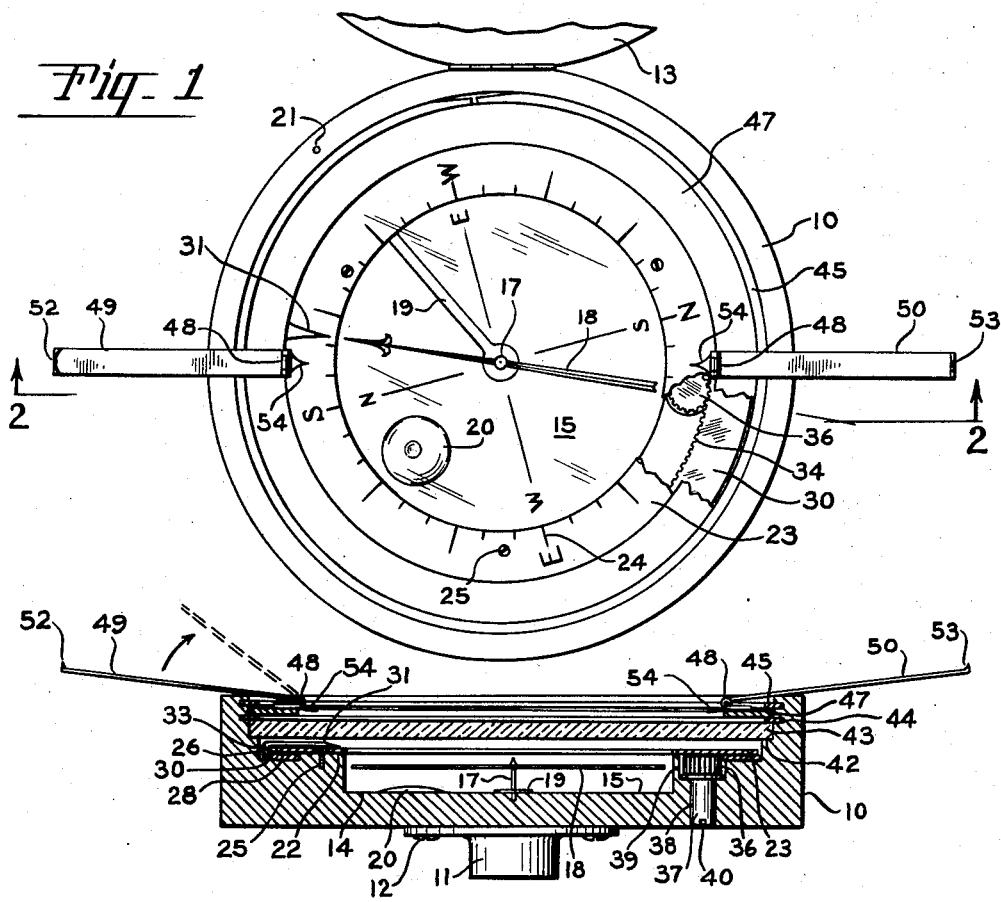
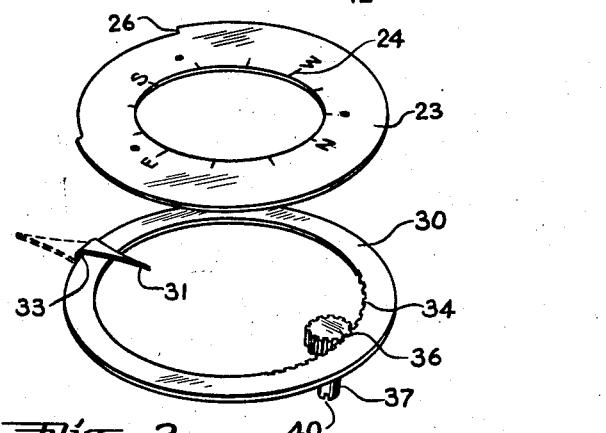
INVENTOR.
THOMAS R. LE BLEU
BY
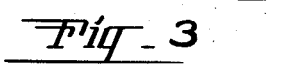
Attorneys

United States Patent Office 2,857,679
Patented Oct. 28, 1958

2,857,679

SURVEYOR'S COMPASS

Thomas R. Le Bleu, Sutherlin, Oreg.

Application October 25, 1956, Serial No. 618,366

2 Claims. (Cl. 33—224)

This invention relates to improvements in a surveyor's compass.

The general object of the invention is to provide a surveyor's compass having improved sight means.

Another object is to provide a hand compass having sight arms with a long sight base which are readily foldable compactly into the compass case when the compass is not being used.

Another object is to provide a compass having compact foldable sight arms adjustable vertically for taking inclined sightings up hill or down hill.

Another object is to provide a surveyor's compass having an improved declination ring and associated compass scale arrangement which facilitates a convenient and rapid adjustment for the magnetic declination.

Still another object is to provide an improved compass case structure for housing a magnetic needle, declination adjustment means, and sight means, which is of relatively simple and inexpensive construction but rugged and reliable for field use.

The above objects are achieved by a compass comprising a casing which may be supported in a fixed position on a staff. In addition to the usual magnetic needle and compass scale, the present casing houses a fixed ring, having a second compass scale thereon, and an adjustable declination ring having a pointer overlying the fixed ring. Also disposed in the housing above the fixed ring is a sight ring which carries diametrically disposed front and rear sight arms having a hinged connection with the sight ring and being foldable into the casing when the compass is not in use.

The invention will be better understood and additional objects and advantages will become apparent from the following description taken in connection with the accompanying drawings which illustrate a preferred form of the invention. It is to be understood, however, that the invention may take other forms, and that all such modifications and variations within the scope of the appended claims which will occur to persons skilled in the art are included in the invention.

In the drawings:

Figure 1 is a top plan view of a compass constructed in accordance with the present invention;

Figure 2 is a sectional view taken on the line 2—2 of Figure 1; and

Figure 3 is a perspective view of the degree ring and declination ring, these two parts being shown in exploded relation.

Referring to the drawings, the present invention comprises a non-magnetic compass casing or box 10 having a staff socket 11 detachably secured to its under surface by screws 12. The socket is internally threaded to receive a staff for supporting the instrument rigidly at a convenient height above the ground for taking a sight when a bearing is to be established. The casing 10 has a top opening adapted to be closed by a hinged cover 13. This casing has an interior bottom wall 14 on which is provided a compass card 15 having the usual compass points. Supported on the bottom wall by a pivot 17 is a magnetic needle 18, and conventional lever means 19 is associated with the needle for lifting it off its pivot when the cover is closed to minimize the wear on its pivot point. Lever 19 is raised by engagement of cover 13 with a projecting pin 21 in the casing 10. A leveling device 20 is mounted on the bottom wall 14 and comprises a transparent liquid filled bulb having a bubble therein.

Interiorly of the compass casing is a first annular ledge or seat 22 upon which is fixedly mounted a degree ring 23 having on its top surface a compass scale 24. The ring 23 is secured to the compass box by non-magnetic fastening means such as brass screws 25, and, as seen in Figure 3, it has a notch 26 on its peripheral edge which extends approximately thirty degrees east and west of its south point. As seen in Figure 1, ring 23 is placed in a set position whereby its south point is located at the north point on the compass card 15. This transposition of the markings on this scale provides a convenient direct reading for the type of sighting device employed with this compass, to be described.

Ledge 22 has a groove 28 for rotatably receiving a declination ring 30, shown in detail in Figure 3, having a pointer 31 which is connected to the outer peripheral edge of the ring and is directed toward the center of the ring. In a preferred construction, the pointer 31 is stamped integral with the ring 30 in outstanding position, as shown in dotted lines, and then is bent over, as shown in full lines, to overlie the ring 23, this pointer having an upright attaching wall portion 33 which spaces said pointer above the ring 30 a distance sufficient so that it is capable of overlying the ring 23. The ring 30 is freely rotatable in the groove 28 and has interior gear teeth 34 which, similar to the notch 26 in the ring 23, extend through approximately sixty degrees. Engageable with the gear teeth 34 is a pinion 36 on a short shaft 37, and, as seen in Figure 2, the compass casing has a bottom bore 38 and a counterbore 39 for receiving the shaft 37 and pinion 36, respectively, the counterbore 39 being located in a predetermined position adjacent the inner wall of the groove 28 so that the pinion 36 meshes with the gear teeth 34 on the ring 30. The shaft 37 has a screwdriver slot 40 in its bottom end, and by rotation of said shaft the declination ring 30 may be adjusted to set off the proper declination for a given locality, the pointer 31 traveling in the notch 26 of the ring 23. Shaft 37 has a frictional fit in its bore 38 to maintain the declination ring in a set position.

Spaced above the ring 23 and seated on a higher ledge 42 is a glass 43 held in place by a snap ring 44 seated in a suitable groove in the compass casing. Rotatably mounted between the snap ring 44 and another snap ring 45 is a sight ring 47 on which is mounted a pair of diametrically disposed hinges 48 to which are attached front and rear vanes or arms 49 and 50, respectively. The front arm has an upstanding perpendicular sight 52, preferably in the form of a bead or post, and the rear arm has an upstanding perpendicular sight 53, preferably in the form of a notch, similar to gun sights. The portions of the hinges 48 which are secured to the ring 47 are provided with pointers 54 which overlie the stationary degree ring 23. The front and rear sight arms 49 and 50 are foldable toward each other into the compass box when the compass is not being used and lie below the inside of the cover 13 to permit the cover to be closed. When the cover is open it permits full 360° rotation of the sight ring with sight arms extended.

By rotating the pinion 36 in the proper direction for shifting the ring 30 through an angle equal to the magnetic declination, the present compass is set up to obtain true bearings. In using the present compass, such as for taking the bearing of a line, the casing is mounted on a staff which is placed on a point on the line and then leveled by centering the bubble in the leveling device 20. Assuming the ring 30 is set for the magnetic declination, the casing is rotated bodily to align pointer 31 with the north end of the magnetic needle as shown in Figure 1. In such position the compass card 15 indicates the true directions corrected for magnetic declination. The sight ring is then rotated to align the sights with a distant point on the line. As the graduations on degree ring 23 are transposed in inverted relation to the markings on compass card 15, the true bearing of the line is then read under the pointer 54 of rear sight 50. Such arrangement permits a true reading to be taken conveniently directly under this sight without correction of each reading for declination.

When a bearing is taken down hill, the rear arm 50 may be raised on its hinge until the observed reference point is brought into line with the front and rear sights 52 and 53 and when a bearing is taken up hill the front arm 49 may be raised. Thus, sightings may be made on an incline without the conventional cumbersome vertical sight bars.

When the compass is not being used, the sight arms 49 and 50 are folded into the casing and the cover closed over the arms, lifting the magnetic needle off its pivot.

Having now described my invention and in what manner the same may be used, what I claim as new and desire to protect by Letters Patent is:

1. A surveyor's compass comprising a circular casing containing a magnetic compass needle, an annular ledge in said casing around said needle, a degree ring fixedly secured on said ledge, an annular groove in said ledge under said degree ring, a declination ring mounted for rotation in said groove, a pointer on said declination ring overlying said degree ring, an annular ledge in said casing above said degree ring and pointer, a glass on said ledge, a sight ring mounted for rotation in said casing above said glass, a pointer on said sight ring, folding, extendable sight arms on said sight ring, and a cover on said casing enclosing said sight arms when said arms are folded against said glass.

2. A surveyor's compass comprising a casing containing a magnetic compass needle, a stationary compass card in the bottom of said casing beneath said needle, an annular ledge in said casing around said needle and compass card, a degree ring fixedly secured on said ledge, an annular groove in said ledge under said degree ring, a declination ring mounted for rotation in said groove, a pointer on said declination ring overlying said degree ring, an annular ledge in said casing above said degree ring and pointer, a glass on said ledge, a sight ring mounted for rotation in said casing above said glass, a pointer on said sight ring overlying said glass and said degree ring, and a pair of sight arms pivotally mounted on opposite sides of said sight ring, said sight arms extending outwardly beyond said casing and being foldable substantially flat against said glass.

References Cited in the file of this patent

UNITED STATES PATENTS

| 43,036 | Martin | June 7, 1864 |
| 709,046 | Rueger | Sept. 16, 1902 |
| 921,889 | Reynolds | May 18, 1909 |
| 988,665 | Sanders | Apr. 4, 1911 |
| 1,474,394 | Warburg | Nov. 20, 1923 |
| 2,613,629 | Maybarduk | Oct. 14, 1952 |

FOREIGN PATENTS

| 366,210 | Great Britain | Feb. 4, 1932 |